United States Patent
Masters et al.

(10) Patent No.: US 6,247,276 B1
(45) Date of Patent: Jun. 19, 2001

(54) OUTRIGGER CONNECTOR FOR A FACTORY MADE BUILDING

(75) Inventors: William C. Masters, Lakeland, FL (US); William J. Kalker, Jr., Monroe, CT (US)

(73) Assignee: Building Technologies, Inc., Bartow, FL (US)

( * ) Notice: Subject to any disclaimer, the term of this patent is extended or adjusted under 35 U.S.C. 154(b) by 0 days.

(21) Appl. No.: 09/391,176

(22) Filed: Sep. 7, 1999

(51) Int. Cl.[7] .................................................. B60R 27/00
(52) U.S. Cl. ...................... 52/169.12; 52/23; 52/DIG. 11
(58) Field of Search ........................ 52/698, 23, DIG. 11, 52/DIG. 3, 169.12

(56) References Cited

U.S. PATENT DOCUMENTS

| | | |
|---|---|---|
| 490,780 | 1/1893 | Zimmerman . |
| 1,193,767 | 8/1916 | Crisell . |
| 2,972,490 | 2/1961 | Styx . |
| 3,054,151 | 9/1962 | Shankland . |
| 3,335,531 * | 8/1967 | Grimelli et al. ............. 52/DIG. 11 X |
| 3,371,902 | 3/1968 | Hartwick . |
| 3,378,889 | 4/1968 | Dunderdale . |
| 3,736,711 | 6/1973 | Thornbrugh . |
| 3,744,192 * | 7/1973 | Burnett ........................ 52/DIG. 11 X |
| 3,747,288 | 7/1973 | Grimelii . |
| 3,775,917 * | 12/1973 | Struben ......................... 52/DIG. 3 X |
| 3,910,001 | 10/1975 | Jackson . |
| 3,972,170 | 8/1976 | Brammer . |
| 4,125,975 * | 11/1978 | Soble ........................ 52/DIG. 11 X |
| 4,148,162 | 4/1979 | Goodrich . |
| 4,294,053 | 10/1981 | Lopes . |
| 4,342,177 | 8/1982 | Smith . |
| 4,429,851 | 2/1984 | DeJager . |
| 4,570,403 | 2/1986 | Dannemiller . |
| 4,793,110 * | 12/1988 | Tucker ........................ 52/DIG. 11 X |
| 4,846,610 | 7/1989 | Schoenleben . |
| 4,896,985 | 1/1990 | Commins . |
| 4,995,206 | 2/1991 | Colonias et al. . |
| 5,026,230 | 6/1991 | Dolezvch et al. . |
| 5,061,130 | 10/1991 | Gadow . |
| 5,083,404 * | 1/1992 | Schulte ........................ 52/DIG. 11 X |
| 5,092,099 | 3/1992 | Valente . |
| 5,146,724 * | 9/1992 | Angelo ........................ 52/DIG. 11 X |
| 5,355,640 | 10/1994 | Frye . |
| 5,491,935 | 2/1996 | Coxum . |
| 5,687,512 * | 11/1997 | Spoozak et al. ............. 52/DIG. 11 X |
| 5,701,715 * | 12/1997 | Masters et al. ............. 52/DIG. 11 X |
| 5,983,573 * | 11/1999 | MacKarvich ............................ 52/23 |

* cited by examiner

Primary Examiner—Peter M. Cuomo
Assistant Examiner—Hanh V. Tran
(74) Attorney, Agent, or Firm—David G. Maire; Robert L. Wolter

(57) ABSTRACT

A factory made building such as a mobile home (10) utilizing a connector (32, 60) attached to each of a plurality of outrigger beams (18) for stabilizing the mobile home (10) against strong winds. The mobile home (10) includes a structural support beam such as an I-beam (16) and a plurality of outrigger beams (18). An outrigger connector (32, 60) with an L-shaped portion (34) including a slot (46) and a protruding portion (56) extending outward from the L-shaped portion (34) at a substantially perpendicular angle is attached to each outrigger beam (18) at the protruding portion (56). A hurricane strap (48) is attached to the slot (46) and to a ground anchor (88) to secure the mobile home (10).

26 Claims, 3 Drawing Sheets

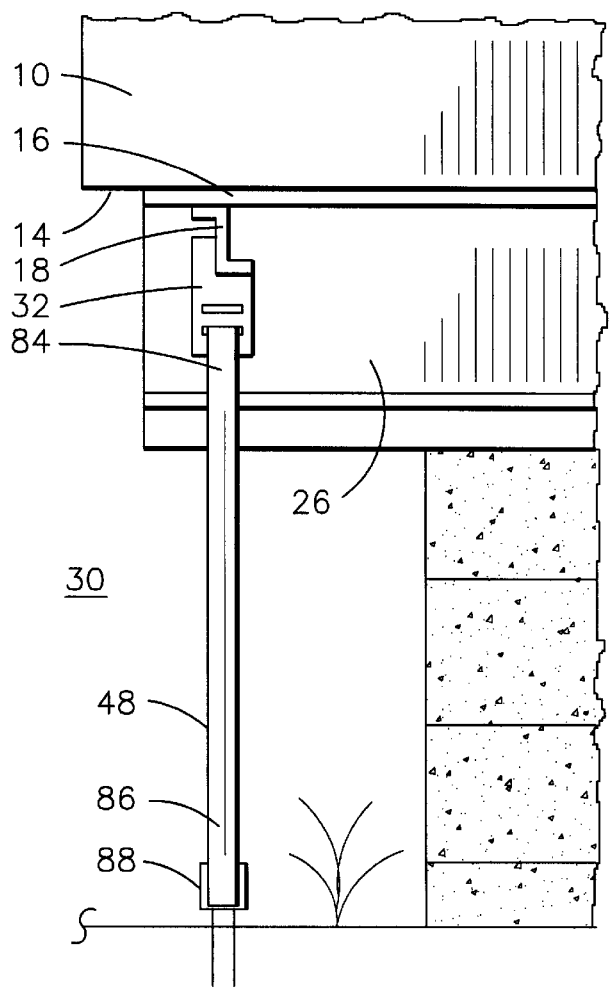
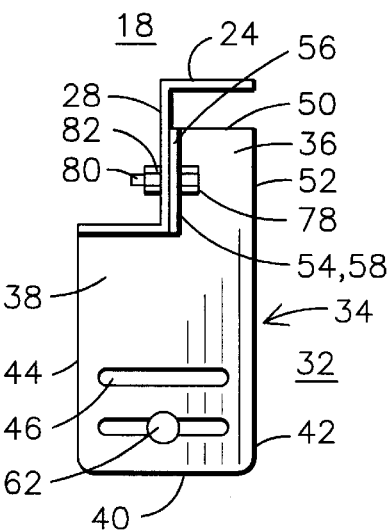
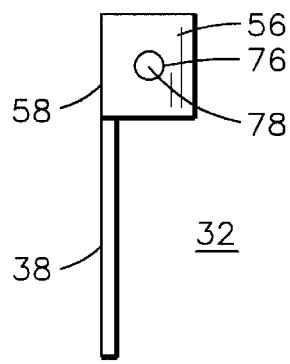
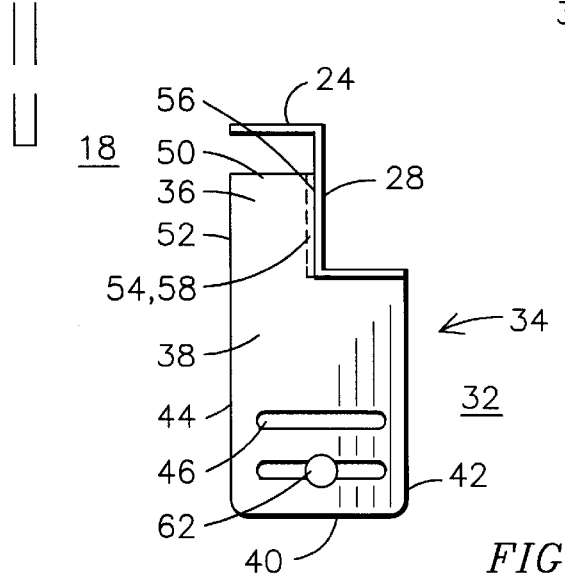
FIG. 2
FIG. 3
FIG. 4
FIG. 5

OUTRIGGER CONNECTOR FOR A FACTORY MADE BUILDING

FIELD OF THE INVENTION

The field of this invention relates to factory made buildings such as mobile homes, and more specifically, to an outrigger connector for securing an outrigger beam to the ground in order to stabilize the factory made building.

BACKGROUND OF THE INVENTION

A connector for securing a factory made building such as a mobile home to the ground is known in the prior art. Connecting a mobile home or the like to a secured ground anchor is essential when the mobile home is subjected to strong winds such as hurricanes, tornadoes, and other violent storms.

In the past, the primary method of stabilizing the mobile home was through the use of hurricane straps that were looped over the roof of the mobile home and attached at one end to a hurricane anchor embedded in the ground at one side of the mobile home and attached at the other end to a hurricane anchor embedded in the ground at an opposing side of the mobile home. While this method was able to counter most of the vertical forces applied to the mobile home, it was ineffective at countering the horizontal forces exerted. Also, this method created a problem because many times the roof rafters used were not capable of withstanding the forces applied to them.

To resolve the problem with the roof rafters, connectors were developed that countered the vertical forces exerted on the mobile home by attaching a tether such as a chain directly to the I-beam of a mobile home at one end while attaching the tether to a vertically disposed ground anchor at the other end. For example, U.S. Pat. No. 4,294,053 to Lopes discloses an anchor with a clamping element that is used to engage an I-beam of a mobile home, with a chain extending downward from the clamping element that is secured to the ground. However, this approach fails to counter the horizontal wind forces frequently encountered by mobile homes. Also, the I-beams of a mobile home are generally positioned well inside the skirt of the home, making them difficult to access. This makes the attachment of tethers to the I-beams a laborious exercise.

Accordingly, it is an object of this invention to provide a connector that is easy to attach to a mobile home. It is a further object of this invention to provide a connector that effectively counters the horizontal as well as the vertical wind forces that may be exerted on the mobile home.

SUMMARY OF THE INVENTION

In order to achieve these and other objects of the invention, a factory made building such as a mobile home is provided with a frame portion having an underside, a structural support beam disposed along the underside and in support thereof, a plurality of outrigger beams, and a means attached to each outrigger beam for connecting the outrigger beam to the ground. Each outrigger beam has a first end, a second end, and an upper portion, and is attached to the support beam proximate the first end so that the second end extends outward from the support beam. The upper portion of the outrigger beam is attached to the underside of the frame portion.

The means for connecting the outrigger beam to the ground may include a connector that includes an L-shaped portion having a top leg integrally formed with a bottom leg. The bottom leg has a first edge and a second edge and includes a slot capable of receiving a hurricane strap therein. The top leg has a first edge contiguous with the first edge of the bottom leg and a second edge extending vertically above the bottom leg intermediate the first and second edges of the bottom leg. The top leg also has a protruding portion with an edge integrally attached to the second edge of the top leg and extending outward from the L-shaped portion at a substantially perpendicular angle. The protruding portion is attached to the outrigger beam.

In one embodiment of the present invention, the bottom leg and the top leg are coplanar. In another embodiment, the bottom leg extends vertically downward and horizontally away from the top leg.

To secure the mobile home against strong winds, a hurricane strap is attached to the slot in the bottom leg at a first end and is attached to a ground anchor at a second end opposed the first end.

BRIEF DESCRIPTION OF THE DRAWINGS

FIG. 2 is a front view of a corner of the mobile home of FIG. 1.

FIG. 3 is a rear view of an outrigger connector attached to an outrigger beam in accordance with the present invention.

FIG. 4 is a side view of an outrigger connector in accordance with the present invention.

FIG. 5 is a front view of an outrigger connector attached to an outrigger beam in accordance with the present invention.

Like structures are numbered consistently in all of the Figures.

DETAILED DESCRIPTION OF THE INVENTION

Figure 1:
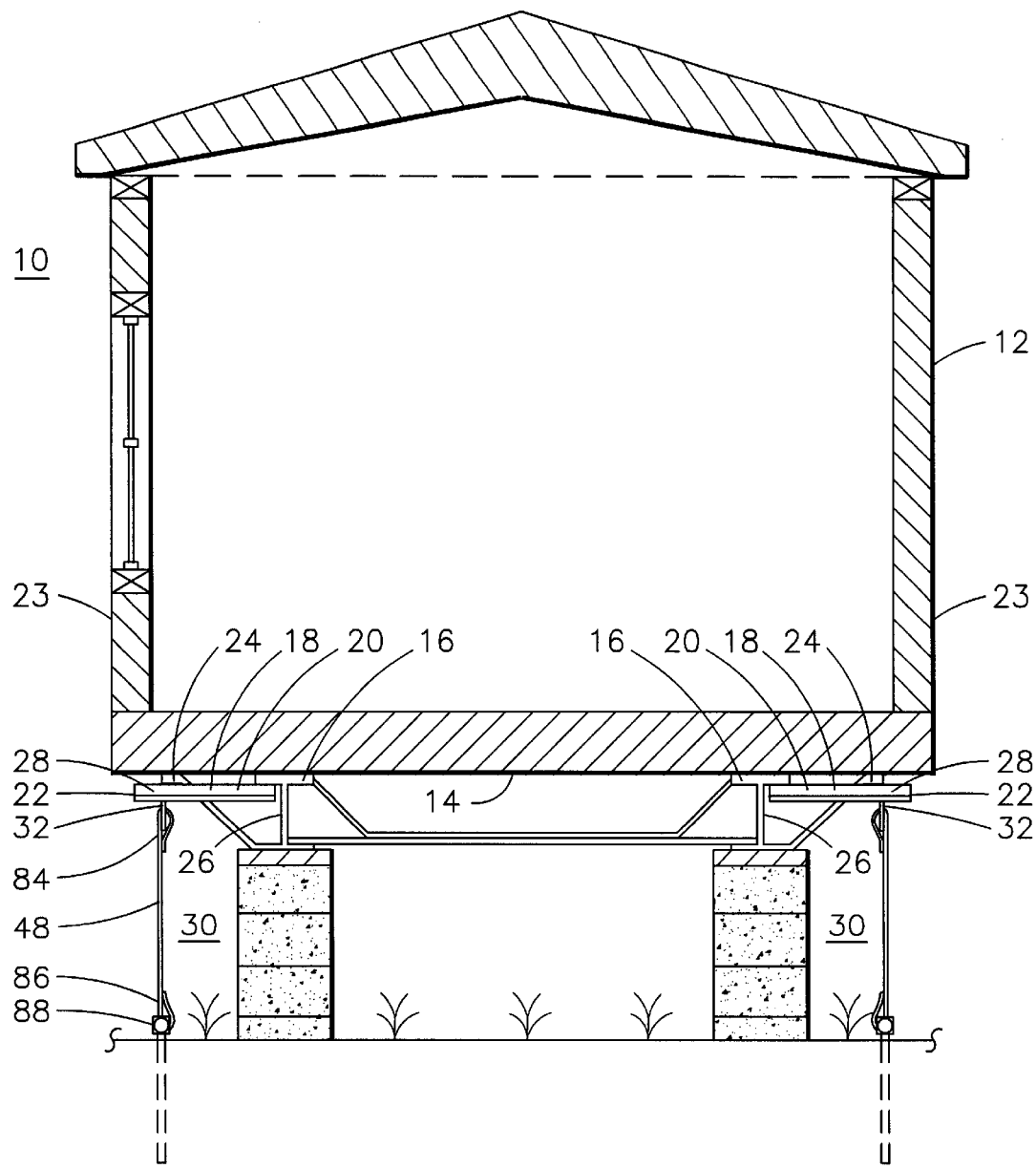
FIG. 1 is an end view of a mobile home secured by outrigger connectors with hurricane straps attached thereto in accordance with the present invention.
Figure 7:
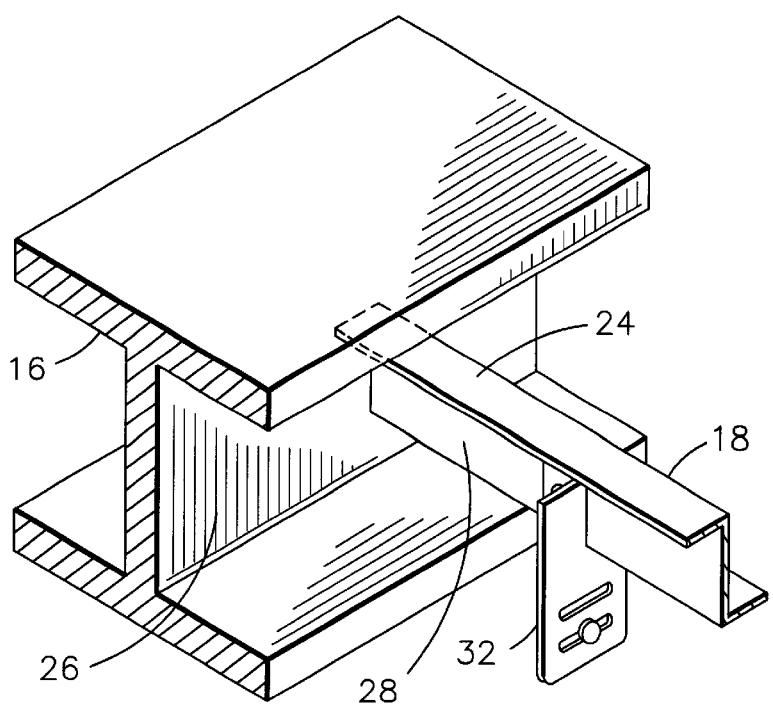
FIG. 7 is a perspective view of an outrigger connector attached to an outrigger beam in accordance with the present invention.
Figure 6:
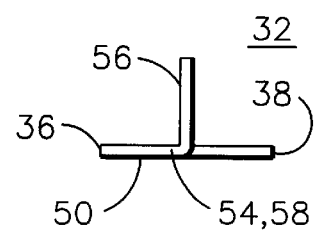
FIG. 6 is a top view of an outrigger connector in accordance with the present invention.

Referring to FIGS. 1 and 2, a factory made building such as a mobile home 10 includes a frame portion 12 having an underside 14 and a structural support beam such as an I-beam 16 disposed along the underside 14 and in support thereof. Each of a plurality of outrigger beams 18 having a first end 20, a second end 22, and an upper portion 24 is attached to the I-beam 16 proximate the first end 20, with the second end 22 extending outward from the I-beam 16, typically at a substantially perpendicular angle in a generally horizontal direction toward a side 23 of the frame portion 12. The outrigger beams 18 are attached to the I-beam 16 at evenly spaced intervals along an outwardly-exposed surface 26 of the I-beam 16 and at opposed sides of the mobile home 10 so that the forces to be applied to the outrigger beams 18 will be distributed symmetrically around the home 10. The I-beam 16 and the outrigger beam 18 may be composed of a metallic material and may be attached by weld 15.

The upper portion 24 of the outrigger beam 18 may be attached to the underside 14 of the frame portion 12 proximate the second end 22 in order to provide additional support and to maximize the integrity of the attachment. The outrigger beam 18 and the underside 14 may be composed of a metallic material and may be attached by welding. Alternatively, the outrigger beam 18 may be attached to the underside 14 by any fastener known to those skilled in the art, such as a bolt and nut combination.

Typically, each outrigger beam 18 includes at least one vertically-disposed surface 28 extending longitudinally between the first and second ends 20, 22. For example, the outrigger beam 18 may be C-shaped, U-shaped, or I-shaped, or, as illustrated in the Figures, Z-shaped.

Attached to each outrigger beam 18 is a means 30 for connecting the outrigger beam 18 to the ground. FIGS. 1–7 illustrate one embodiment of the present invention, in which means 30 includes a connector 32. Referring specifically to FIGS. 3–6, connector 32 includes an L-shaped portion 34 having a top leg 36 coplanar and integrally formed with a bottom leg 38. The bottom leg 38 has a bottom end 40, a first edge 42, and a second edge 44 and includes at least one slot 46 capable of receiving a tether such as a hurricane strap 48 therein. The top leg 36 has a top end 50, a first edge 52 contiguous with the first edge 42 of the bottom leg 38, and a second edge 54 extending vertically above the bottom leg 38 intermediate the first and second edges 42, 44 of the bottom leg 38. Connector 32 further includes a protruding portion 56 having an edge 58 integrally attached to the second edge 54 of the top leg 36 and extending outward from the L-shaped portion 34 at a substantially perpendicular angle. The top leg 36, bottom leg 38, and protruding portion 56 are preferably rectangular, but it will be appreciated by those skilled in the art that top leg 36, bottom leg 38, and protruding portion 56 may take any number of shapes.

Figure 8:
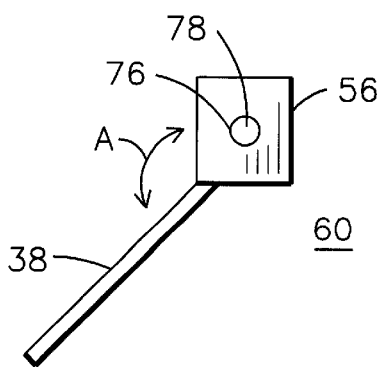
FIG. 8 is a side view of an outrigger connector in accordance with a preferred embodiment of the present invention.

FIG. 8 illustrates another embodiment of the present invention, in which means 30 includes a connector 60 essentially the same as connector 32, but with the bottom leg 38 extending vertically downward and horizontally away from the top leg 36 and from the protruding portion 56 so that the angle of separation A between the planes of the bottom leg 38 and the top leg 36 may be approximately 135 degrees, or preferably some angle between 90 and 180 degrees.

Figure 10:
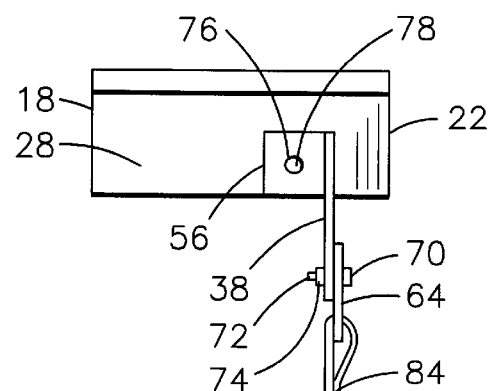
FIG. 10 is a side view of an outrigger connector and swivel piece combination secured to an outrigger beam and attached to a hurricane strap in accordance with a preferred embodiment of the present invention.
Figure 9:
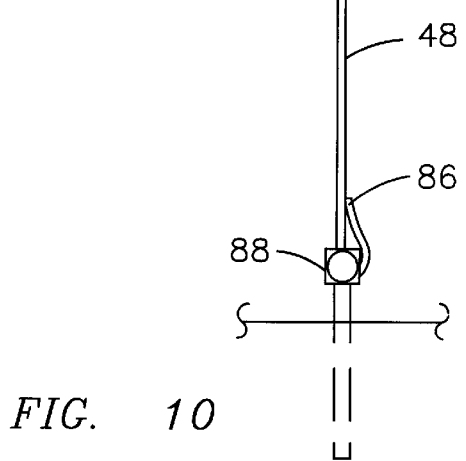
FIG. 9 is a front view of a swivel piece in accordance with the present invention.

Referring to FIGS. 9 and 10, the bottom leg 38 of connectors 32 and 60 may include a hole 62 therein for attachment of a swivel piece 64. The swivel piece 64 may be generally U-shaped, and includes a hole 66 formed therein and a slot 68 that is capable of receiving a hurricane strap 48 or other type of tether therein. The hole 62 in the bottom leg 38 and the hole 66 in the swivel piece 64 are aligned and the swivel piece 64 is attached to the bottom leg 38 by a swivel connector 70 that is inserted into the aligned holes. The swivel connector 70 may be the combination of a bolt 72 and a nut 74, or any other device capable of transmitting a tensile load between bottom leg 38 and swivel piece 64 while allowing relative rotation therebetween.

Referring to FIGS. 2, 3, 5, 7, and 10, the protruding portion 56 of connector 32 or 60 is attached to outrigger beam 18 as shown, preferably proximate the second end 22 and at the vertically-disposed surface 28. The outrigger beam 18 and connector 32 or 60 may be composed of a metallic material and may be attached by welding. In one embodiment of the present invention, a hole 76 is included in the protruding portion 56 of connector 32 or 60, preferably proximate the center of the protruding portion 56, and the outrigger beam 18 and the connector 32 or 60 are attached by inserting a fastener 78 in the hole 76. The fastener 78 may comprise the combination of a bolt 80 and a nut 82, or any other combination known to those skilled in the art.

Referring to FIG. 10, for each connector 32 or 60 a first end 84 of a hurricane strap 48 may be attached to slot 46 in bottom leg 38, or, if swivel piece 64 is attached to bottom leg 38, to slot 68 in swivel piece 64. A second end 86 of the hurricane strap 48 opposed the first end 84 is secured to a ground anchor 88. Each ground anchor 88 is then positioned and secured in the ground so that the hurricane strap 48 is drawn taut and is coplanar with the bottom leg 38 or the swivel piece 64. Coplanar alignment of the strap 48 and the bottom leg 38 and/or the swivel piece 64 is important because the amount of force that may be transmitted by connector 32 or 60 in a direction coplanar to the bottom leg 38 or the swivel piece 64 is higher than in a non-coplanar direction due to potential bending of the bottom leg 38 or swivel piece 64. If the hurricane strap 48 is attached to slot 68 in swivel piece 64, the ground anchor 88 may be positioned anywhere within the angular range of motion of the swivel piece 64. The ground anchor 88 is preferably placed proximate the area beneath the skirt of the home 10.

The cumulative effect of the vertical force components applied to the mobile home 10 by the connector/strap/anchor sets effectively stabilizes the home 10 against all upward vertical forces that may be exerted on the home 10. In the embodiment described above and illustrated in FIG. 8, in which an angle of separation A exists between the bottom leg 38 and the top leg 36, the mobile home 10 is effectively stabilized against all horizontal wind forces as well as all vertical wind forces that may be exerted on the home 10, as it is able to transfer force in any horizontal direction by means of the interaction between the connector/strap/anchor sets located on opposing sides of the home 10.

It will be appreciated by those skilled in the art that means 30 for connecting the outrigger beam 18 to the ground may comprise any tether known in the art capable of carrying a tensile load, such as a chain, rope, bar, or wire, or a hurricane strap 48 as disclosed above and in the FIGS. It will be further appreciated that such tether may be attached to connector 32 or 60 as described above, or alternatively may be attached directly to the outrigger beam 18 at one end and to the ground at a second end. To attach the tether directly to the outrigger beam 18, a hole may be formed in the outrigger beam 18. The tether may then be inserted into and secured within the hole, or a bolt may be inserted into the hole and the tether secured to the bolt. Alternatively, if the tether is composed of a metallic material, the tether may be welded directly to the outrigger beam 18.

Significantly, the outrigger beam 18 is much more accessible than the I-beam 16, which makes attachment of a hurricane strap 48 to the outrigger beam 18 easier and less time-consuming than attachment of the strap 48 directly to the I-beam 16.

Other aspects, objects, and advantages of this invention may be obtained by studying the Figures, the disclosure, and the appended claims.

What is claimed is:

1. A factory made building, comprising;
   a frame portion having an underside;
   a structural support beam disposed along the underside and in support thereof;
   a plurality of outrigger beams wherein each outrigger beam includes a first end, a second end, and an under portion, said outrigger beam attached to said support beam proximate said first end so that said second end extends outward from said support beam, and said upper portion being attached to said underside; and
   a means for connecting each outrigger beam to the ground,
   wherein said means for connecting each outrigger beam to the ground comprises a connector including an L-shaped portion having a top leg integrally formed with a bottom leg, said bottom leg having a first edge and a second edge and including a slot capable of receiving a tether therein, said top leg having a first edge contiguous with the first edge of said bottom leg and a second edge extending vertically above said bottom leg intermediate the first and second edges of said bottom leg, and a protruding portion having an edge integrally attached to the second edge of said top leg and extending outward from said L-shaped portion at a substantially perpendicular angle, said protruding portion being attached to said outrigger beam.

2. The factory made building of claim 1 wherein said bottom leg and said top leg are coplanar.

3. The factory made building of claim 1 wherein said bottom leg extends vertically downward and horizontally away from said top leg and from said protruding portion.

4. The factory made building of claim 3 wherein the angle of separation between the planes of the bottom leg and the top leg is approximately 135 degrees.

5. The factory made building of claim 1 wherein the bottom leg includes a hole and further comprising a swivel piece having a slot capable of receiving a tether therein and a hole formed therein aligned with the hole in the bottom leg, said swivel piece attached to said bottom member by a swivel connector that is inserted into the aligned holes.

6. The factory made building of claim 5 wherein said swivel connector comprises a bolt and nut combination.

7. T he factory made building of claim 1 further comprising a tether attached to the slot in said bottom leg at a first end and attached to a ground anchor at a second end opposed said first end, wherein said ground anchor is secured in the ground so that the tether is drawn taut and is coplanar with said bottom leg.

8. The factory made building of claim 1 wherein each said outrigger beam has at least one vertically-disposed surface, and wherein said protruding portion is attached to the outrigger beam at said vertically-disposed surface.

9. The factory made building of claim 1 wherein the top leg, bottom leg, and protruding portion are rectangular.

10. The factory made building of claim 1 wherein said protruding portion includes a hole, and further comprising a fastener inserted in the hole for attaching the protruding portion to the outrigger beam.

11. A method of securing a factory made building to the ground, the factory made building including a frame portion with an underside, a structural support beam disposed along the underside and in support thereof, and a plurality of outrigger beams wherein each outrigger beam includes a first end, a second end, and an upper portion, each outrigger beam attached to the support beam proximate the first end so that the second end extends outward from the support beam, and the upper portion being attached to the underside, the method comprising the steps of:
   providing a connector for connecting each outrigger beam to the ground;
   attaching the connector to the outrigger beam; and
   attaching the connector to the ground;
   wherein the step of providing a connector comprises the step of providing the connector to include an L-shaped portion having a top leg integrally formed with a bottom leg, the bottom leg having a first edge and a second edge and including a slot capable of receiving a tether therein, the top leg having a first edge contiguous with the first edge of the bottom leg and a second edge extending vertically above the bottom leg intermediate the first and second edges of the bottom leg, and a protruding portion having an edge integrally attached to the second edge of the top leg and extending outward from the L-shaped portion at a substantially perpendicular angle, the protruding portion being attachable to the outrigger beam.

12. The method of claim 11 wherein the step of providing a connector comprises the step of forming the bottom leg and the top leg so that they are coplanar.

13. The method of claim 11 wherein the step of providing a connector comprises the step of forming the bottom leg and the top leg so that the bottom leg extends vertically downward and horizontally away from the top leg.

14. The method of claim 13 wherein the step of forming the bottom leg and the top leg includes the step of providing an angle of separation between the planes of the bottom leg and the top leg of approximately 135 degrees.

15. The method of claim 11 wherein the step of providing a connector further comprises the step of forming a hole in the bottom leg of each connector, and comprising the additional steps of:
   providing a swivel piece having a slot capable of receiving a tether therein and a hole formed therein;
   aligning the hole in the bottom leg of each connector with the hole in the swivel piece; and
   inserting a swivel connector into the aligned holes.

16. The method of claim 15 wherein the step of inserting a swivel connector into the aligned holes comprises the steps of inserting a bolt into the aligned holes and securing the bolt within the aligned holes with a nut.

17. The method of claim 11 wherein the step of attaching the connector to the ground comprises the steps of:
   attaching a first end of a tether to the slot in the bottom leg;
   attaching a second end of the tether opposed the first end to a ground anchor; and
   securing the ground anchor in the ground so that the tether is drawn taut and is coplanar with the bottom leg.

18. The method of claim 11 wherein the step of attaching the connector to the outrigger beam comprises the step of welding the protruding portion to a vertically-disposed surface of the outrigger beam.

19. The method of claim 11 wherein the step of attaching the connector to the outrigger beam comprises the steps of:
   forming a hole in the protruding portion;
   inserting a fastener in the hole for attaching the protruding portion to the outrigger beam; and
   fastening the protruding portion to the outrigger beam.

20. An outrigger connector for stabilizing a factory made building, the factory made building including a frame portion with an underside, a structural support beam disposed along the underside and in support thereof, and a plurality of outrigger beams wherein each outrigger beam includes a first end, a second end, and an upper portion, each outrigger beam attached to the support beam proximate the first end so that the second end extends outward from the support beam, and the upper portion being attached to the underside, the outrigger connector comprising an L-shaped portion having a top leg integrally formed with a bottom leg, said bottom leg having a first edge and a second edge and including an opening capable of receiving a tether therein, said top leg having a first edge contiguous with the first edge of said bottom leg and a second edge extending vertically above said bottom leg intermediate the first and second edges of said bottom leg, and a protruding portion having an edge integrally attached to the second edge of said top leg and extending outward from said L-shaped portion at a substantially perpendicular angle, said protruding portion being adapted for attachment to said outrigger beam.

21. The outrigger connector of claim 20 wherein said bottom leg and said top leg are coplanar.

22. The outrigger connector of claim 20 wherein said bottom leg extends vertically downward and horizontally away from said top leg.

23. The outrigger connector of claim 22 wherein the angle of separation between the planes of the bottom leg and the top leg is approximately 135 degrees.

24. The outrigger connector of claim 20 wherein the opening in the bottom leg comprises a hole and further comprising a swivel piece having an opening capable of receiving a tether therein and a hole formed therein aligned with the hole in the bottom leg, said swivel piece attached to said bottom leg by a swivel connector that is inserted through the aligned holes.

25. The outrigger connector of claim 24 wherein said swivel connector comprises a bolt and nut combination.

26. The outrigger connector of claim 20 wherein said protruding portion includes a hole, and further comprising a fastener inserted in the hole for attaching the protruding portion to the outrigger beam.

* * * * *